United States Patent Office 2,959,469
Patented Nov. 8, 1960

2,959,469
PROCESS FOR PRODUCTION OF BORON NITRIDE

Frank H. May, Whittier, and Charles C. Cook, Claremont, Calif., assignors to American Potash & Chemical Corporation, a corporation of Delaware No Drawing. Filed Aug. 8, 1957, Ser. No. 676,928

6 Claims. (Cl. 23—191)

This is a continuation-in-part of application Serial No. 517,353, filed June 22, 1955 and now abandoned.

This invention relates to a process for the manufacture of boron containing materials including boron nitride and a novel pyrophoric material.

The literature of boron chemistry contains many methods of making boron nitride; most of these utilize $B_2O_3$ or borax; $N_2$, $NH_3$, or $NH_4Cl$; and Mg or carbon. Several U.S., British and Russian patents (U.S. 1,077,712, British 21,865, Russian 50,556) deal with the preparation of boron nitride from $B_2O_3$, Mg, and $NH_4Cl$. A German Patent (281,701) details the preparation of BN from $B_2O_3$, C, and $NH_3$ at a temperature of 1100°–1800° C. British Patent 16,148 of 1913 describes the preparation of BN from $B_2O_3$ and a cyanide at a temperature of 2000° C. It has also been stated that BN can be formed by reacting $BBr_3$ in liquid $NH_3$, and heating the precipitate mixture to 750° C. (Stock and Holle, Ber. 108,2095). While it has been claimed that BN can be formed by reacting $BCl_3$ with $NH_3$ to form a complex which is then thermally decomposed in the presence of $NH_3$ to form BN, our experience is that the decomposition of the boron trichloride-ammonia complex is exceedingly difficult at temperatures of 1000° C. or less. A major drawback to the methods of preparing BN from $B_2O_3$, carbon or magnesium, and $NH_3$ lies in the sintering and fusing of the reaction products. Several patents (British 483,201, German 282,701) suggest the addition to the reaction mass of a diluent such as a quantity of previously formed BN.

We have found that anhydrous borax provides a most advantageous source of boron and that this can be reacted with magnesium in an inert atmosphere as a first step to provide a reduced boron containing material which thereafter can be reacted with ammonia at an elevated temperature, e.g., above about 650° C. and preferably of the order of about 900° C. to produce boron nitride. The use of anhydrous borax as a source of $B_2O_3$ for the preliminary step results in a reaction product which is more reactive with ammonia and forms BN at a lower temperature with greater efficiency. A typical analysis of the crude unleached magnesium reduced borax is as follows:

| | Percent |
|---|---|
| Total boron | 12.7 |
| Magnesium | 38.0 |
| Sodium | 13.5 |
| Nitrogen | 2.2 |
| Oxygen (by diff.) | 33.6 |
| | 100.0 |

This material is preferably acid leached with a non-oxidizing acid such as hot sulfuric acid or hydrochloric acid to remove acid soluble materials. The slurry is then filtered to remove the acid soluble materials and the filter cake is well washed with water. The solids are next washed with alcohol or acetone to remove entrained water and finally dried under vacuum at moderate temperatures (60°–80° C.). It is necessary to displace all of the water and to dry this material under vacuum because it is rapidly oxidized by either air or water vapor at these temperatures. A typical analysis of the dry acid leached material is as follows:

| | Percent |
|---|---|
| Total boron | 71.0 |
| Water soluble boron | 0.93 |
| Magnesium | 8.5 |
| Sodium | 8.0 |
| Nitrogen | 3.5 |
| Oxygen (by diff.) | 8.07 |
| | 100.00 |

This acid leached reaction product of anhydrous borax and magnesium is an especially reactive material having valuable properties which make it useful in fuse and igniter formulations. Also, the acid leached and dried material is pyrophoric under some conditions at room temperature; it may ignite spontaneously when dispersed in air during such common operations as pouring, sieving, grinding or mixing. This material cannot be duplicated by mechanically blending the several components found by analysis in the mixture.

By employing anhydrous borax and magnesium, we are able to react these at about 600° C. in an inert atmosphere to form a reduced borax material which is quite reactive with ammonia. Once initiated, the reaction is highly exothermic and the temperature may rapidly exceed 600° C. in the reacting batch. The crude product can be easily pulverized and the pulverized material can be reacted with $NH_3$ at a temperature of from about 700° C. to about 1000° C. for about two hours to produce a non-fused reaction product which when leached with acid and dried yields a boron nitride of 90%–97% purity. When either the acid leached or crude magnesium reduced borax material is heated to 1000° C. in an ammonia atmosphere to produce boron nitride, the majority of the elemental sodium present distills off and may be condensed and recovered as metallic sodium. These sodium vapors aid in maintaining a reducing atmosphere during the nitriding reaction and are most beneficial to some degree as a nitrogen fixation agent;

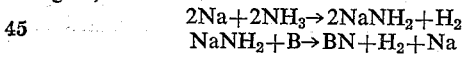

$$2Na+2NH_3 \rightarrow 2NaNH_2+H_2$$
$$NaNH_2+B \rightarrow BN+H_2+Na$$

small amounts of sodium amide are usually formed and condensed in the gas outlet tube of the reactor during the nitriding reaction. Also, the magnesium reduced borax can be nitrided at a lower temperature and with greater efficiency than the corresponding magnesium reduced boric oxide. The greater affinity of the reduced borax product for nitrogen is also indicated by the average nitrogen content of the acid leached products prepared by identical methods; two percent for the magnesium reduced borax and 0.1 percent for the magnesium reduced boric oxide.

The ratio of borax to magnesium can vary widely, the lower limit being that at which the magnesium is present in an amount insufficient to reduce the borax so that leaching of the product is necessary to remove borates, magnesium oxide and other acid soluble materials. Thus, while we have used anhydrous borax to magnesium ratios as high as about 4 to 1, we have found that we can eliminate the fluxing and sintering occasioned by the use of high relative quantities of borax by increasing the amount of magnesium metal to provide a borax to magnesium ratio of the order to 2.0 to 1, preferably about 1.4 to 1 (41.7% magnesium), and we have employed ratios as low as about 1.10 to 1. The fluxing is negligible when the magnesium content is as low as that present at 2-to-1 ratio (33.3% magnesium), but increases rapidly as the ratio is increased by inclusion of more borax. Use of anhydrous borax to magnesium ratios above about 2-to-1, therefore, usually require leaching prior to the ammonia treatment step to remove unreacted borax and the like and so prevent sintering and fusing in the ammonia treatment step. The leaching is usually effected with a non-oxidizing acid such as sulfuric or hydrochloric acid. Because the borides of magnesium and sodium are usually present, the acid leach usually results in considerable foam formation and the acid-material contact must be effected cautiously. The acid also reacts with the borides to form volatile boranes, which are toxic. The use of ratios below 2.0-to-1 is therefore generally to be preferred.

To enable the magnesium to have maximum effectiveness in reducing the borax, the atmosphere in which the magnesium reduction occurs should be oxygen-free. Ammonia is preferably used to provide such atmosphere, but one can also employ other gases such as helium, neon, argon, krypton, xenon, hydrogen, methane, ethane, propane, butane, carbon dioxide and carbon monoxide.

The use of gaseous $NH_3$ as a source of nitrogen in forming BN is preferable to $NH_4Cl$ from a production standpoint, since the hydrogen present as a result of the thermal decomposition of $NH_3$ tends to prevent corrosion of the mild steel trays usually used in this process, whereas the HCl present due to the thermal decomposition of $NH_4Cl$ is extremely corrosive to such trays.

The practice of the invention will become further apparent from a consideration of the following examples.

3600 grams of a mixture of anhydrous borax and magnesium, wherein the weight ratio of borax to magnesium was 1.4/1 (41.7% Mg), was reacted at 610° C. under a protective $NH_3$ atmosphere in a closed mild steel tray to form a reduced borax product. This reduced borax product was then pulverized, replaced in the closed steel tray, and placed in a gas-fired furnace at a temperature of 850° C. $NH_3$ was piped into the closed steel tray at a rate of six pounds per hour for two hours. The crude boron nitride obtained from this reaction was first leached with $H_2SO_4$ (15%), and then with concentrated $HNO_3$ (70%). A total of 700 grams of 96% pure boron nitride was obtained from the 3600 grams starting material. This yield represents an overall process efficiency of 67.2%, based on the amount of magnesium used in the initial reduction reaction.

Other mixtures of borax and magnesium in which the borax to magnesium ratios have varied from 1.4/1 to 2.0/1 have been used. These results are tabulated in Table I:

Table I

| Borax to Mg Ratio | Total weight of mixture (grams) | Yield BN (grams) | Purity, Percent | Percent Eff. |
|---|---|---|---|---|
| 1.4/1 | 3,600 | 700 | 96.0 | 67.2 |
| 1.6 | 3,600 | 550 | 92.5 | 55.2 |
| 1.8/1 | 3,600 | 575 | 91.0 | 62.0 |
| 2.0/1 | 3,600 | 540 | 93.5 | 67.5 |

Borax to magnesium ratios as high as 4.0-to-1 have been used in the reduction-reaction step to produce a reduced borax and borate product. Since this material contained an excess of unreacted borax, fluxing and sintering occurred when this material was reacted with $NH_3$ at temperatures of 700° C. and higher to form BN. To avoid this fluxing and sintering action, the reduced borax obtained from the reduction reaction step at the higher ratios above 2-to-1 was leached with 15% $H_2SO_4$ to remove the excess borates, MgO and other acid soluble materials. The acid leached reduced borax material thus obtained was then reacted with $NH_3$ for two hours at a temperature of 650° C. The BN obtained in this manner was then leached with 70% $HNO_3$ to yield BN of 87% purity.

A quantity of material having a 3.9-to-1 borax to magnesium ratio was reacted to form reduced borax. This material was leached with 10% excess of 15% $H_2SO_4$, based on $Na_2O$, MgO stoichiometric requirements. The resulting material was washed with hot water and then vacuum dried at a temperature over 100° C. to produce a material which was valuable because of its high reactivity. The material, in finely divided form, was pyrophoric in air. It was similar to that described hereinafter in connection with Table III. The dried acid leached reduced borax was then reacted with $NH_3$ at a temperature of 900° C. for two hours to yield BN. This BN product was leached with 70% $HNO_3$ to yield 97% pure BN. Table II gives data for this and for a 2.76-to-1 ratio:

Table II

| Borax to Mg Ratio | Grams Reduction Reaction Mixture | Grams acid leached Material | Grams BN Obtained | Percent Purity | Efficiency based on Mg used, Percent |
|---|---|---|---|---|---|
| 3.9/1 | 250 | 19.8 | 28.5 | 97.0 | 81.8 |
| 2.76/1 | 500 | 39.7 | 60.3 | 95.6 | 67.2 |

To illustrate further the practice of the invention and preparation of an intermediate product useful as such, mixtures of anhydrous borax and magnesium were prepared as indicated in Table III. The mixtures were then placed as six kilogram batches in steel trays and each tray was placed in a furnace at a temperature of approximately 700° C. Ammonia was passed over the trays in a minimum amount sufficient to exclude air but insufficient to form BN. The reduced product was pulverized and acid-leached by adding sufficient concentrated HCl to a slurry of the reduced borax to bring the acidity of the solution to pH 2; 8 to 9 pounds of 12 NHCl were required per kilogram of starting material. The acidified slurry was filtered, washed with hot water, reslurried with 6 NHCl and heated at 90° C. for an hour. The slurry was then filtered, reslurried and refiltered, first with water and then with acetone. The filter cake was then dried. The composition of the starting material and the boron content of the leached product are shown in the following table:

Table III

| Ratio of Borax/Mg: | Percent B |
|---|---|
| 1.5 to 1 | 71.2 |
| 1.5 to 1 | 72.4 |
| 1.16 to 1 | 69.7 |
| 2.76 to 1 | 70.7 |
| 2.76 to 1 | 71.8 |
| 3.9 to 1 | 64.9 |

This product is highly reactive and provides a source material high in boron.

We claim:
1. A process for the manufacture of boron nitride comprising forming a mixture of magnesium and anhydrous borax; adjusting the temperature thereof to a level sufficiently high to initiate a reaction therebetween and allowing said reaction to proceed in the presence of an oxygen-free atmosphere to form a reduced borax product; subjecting the entirety of said product so formed to the action of ammonia gas at a temperature of about 650°–1000° C.; cooling and leaching the product so formed with a mineral acid and drying said product to yield a relatively pure boron nitride.

2. The process of claim 1 wherein the weight ratio of anhydrous borax to magnesium is within the range 4 to 1.10:1.

3. The process of claim 1 wherein the weight ratio of anhydrous borax to magnesium is about 1.4 to 1.

4. A process for the manufacture of boron nitride comprising: forming a mixture of magnesium and anhydrous borax; adjusting the temperature thereof to a level sufficiently high to initiate a reaction therebetween and allowing said reaction to proceed in the presence of an oxygen-free atmosphere to form a reduced borax product; leaching the product so formed with a non-oxidizing acid whereby to dissolve acid-soluble materials; washing the product so formed whereby to remove the said acid-soluble materials and drying said product whereby to remove substantially the entirety of the moisture therein, said drying step being carried out in the absence of oxygen; subjecting the entirety of the product so formed to the action of ammonia gas at a temperature between about 650–1000° C.; cooling and leaching the product so formed with a mineral acid; and drying said product to yield a relatively pure boron nitride.

5. The process of claim 4 wherein the weight ratio of anhydrous borax to magnesium is within the range 4 to 1.10:1.

6. The process of claim 4 wherein the weight ratio of anhydrous borax to magnesium is about 1.4 to 1.

References Cited in the file of this patent

UNITED STATES PATENTS 1,077,712     Heyder _____ Nov. 4, 1913

OTHER REFERENCES

Lange Handbook of Chemistry, Handbook Publishers Inc., Sandusky, Ohio, 5th ed., 1944, page 858.

Gatterman Berichte Der Chemischen Gesellschaft, Jahrig 22, Band 1, 1889, page 195.

Winkler Berichte Der Chemischen Gesellschaft, Jahrig 23, Band 1, pp. 722–780 (1890).

Mellor: "Comprehensive Treatise on Inorganic and Theoretical Chemistry," vol. 5, page 8, 2nd and 3rd para., vol. 8, p. 109, lines 4 to 7.

Jacobson: "Encyclopedia of Chemical Reactions," p. 675, I–2811(b).